W. H. WHITMORE.
Apparatus for Dividing Sugar in Blocks.
No. 47,147.  Patented April 4, 1865.
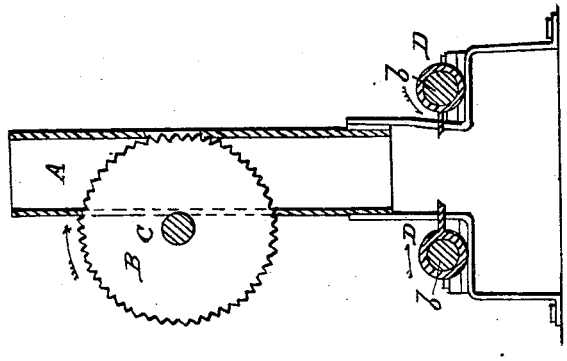
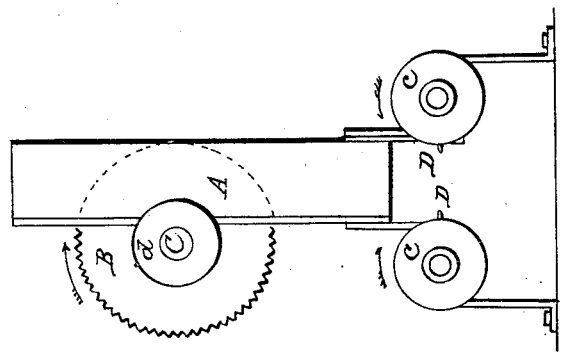
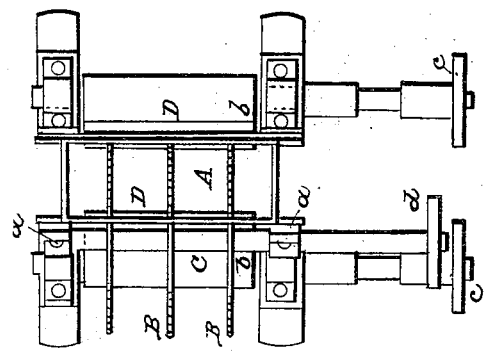
WITNESSES:
INVENTOR.

UNITED STATES PATENT OFFICE.

WM. H. WHITMORE, OF BOSTON, MASSACHUSETTS.

IMPROVED APPARATUS FOR DIVIDING SUGAR IN BLOCKS.

Specification forming part of Letters Patent No. 47,147, dated April 4, 1865.

*To all whom it may concern:*

Be it known that I, WILLIAM H. WHITMORE, of Boston, in the county of Suffolk and State of Massachusetts, have invented a new and useful Machine for Reducing Slabs of Sugar to Blocks or Lumps; and I do hereby declare the same to be fully described in the following specification, and represented in the accompanying drawings, of which—

Figure 1 is a top view, Fig. 2 a side elevation, and Fig. 3 a vertical and transverse section, of it.

In carrying out my invention I employ a spout or conduit, A, which I arrange vertically, or nearly so. This conductor may have a cross-section corresponding with that of each slab to be reduced by the machine. With the said conduit I use one or more or a "gang" of circular saws, B B B, whose shaft C is supported in bearings a a, fixed to the side of the conduit. Each of these saws is to extend through one side of and across the conduit, in manner as shown in the drawings. Below the lower end of the conduit there are arranged two rotary separators, D D, each of which consists of one or more knives projecting radially from one of two shafts, b b, which should be rotated exactly alike, so as to cause both separators to act simultaneously against opposite sides of the slab while it may be passing between them. For this purpose the shafts may be provided with pulleys c c, of equal diameter, and to receive an endless crossed belt, or, what is better, they may be connected by gears of equal diameter, one of which may be revolved by any suitable motor. The saw-shaft may be provided with a pulley, d, or other means of putting it and the saws in rapid revolution.

In the use of this machine it is intended, while the saws and the separators may be in rotation in the directions denoted by the arrows in Fig. 2, that each slab of sugar should be dropped into the upper end of the conduit and upon the saws. The slab by its weight will be so borne against the saws that, while they may be penetrating it, it will descend in the conduit. The saws will also contribute to feed the slab downward within the conduit, and will separate it into a series of long pieces, which, on being carried between the separators, will as they revolve be reduced by them to shorter pieces or blocks or lumps. Prior to their introduction into the machine the slabs of sugar should be prepared for it—that is to say, they should have the requisite width and thickness for being converted into strips and lumps—as described.

I claim as my invention—

The combination of the conduit, one or more saws, and the separators arranged substantially in manner and so as to operate as specified.

W. H. WHITMORE.

Witnesses:
R. H. EDDY,
F. P. HALE, Jr.